(12) United States Patent
Smidt et al.

(10) Patent No.: US 8,444,110 B2
(45) Date of Patent: May 21, 2013

(54) VALVE ARRANGEMENT

(75) Inventors: Verner Smidt, Broager (DK); Lasse Nicolai Langmaack, Nordborg (DK); Siegfried Zenker, Kirchseeon (DE); Erik Haugaard, Graasten (DK); Carsten Christensen, Broager (DK); Welm Friedrichsen, Nordborg (DK)

(73) Assignee: Danfoss A/S, Nordborg (DK)

( * ) Notice: Subject to any disclaimer, the term of this patent is extended or adjusted under 35 U.S.C. 154(b) by 86 days.

(21) Appl. No.: 12/785,727

(22) Filed: May 24, 2010

(65) Prior Publication Data

US 2011/0000555 A1 Jan. 6, 2011

(30) Foreign Application Priority Data

May 29, 2009 (EP) ..................... 09007191

(51) Int. Cl.
*F16K 31/363* (2006.01)
(52) U.S. Cl.
USPC .......................... 251/30.02; 251/44
(58) Field of Classification Search
USPC ..................... 251/30.02, 33, 43, 44
See application file for complete search history.

(56) References Cited

U.S. PATENT DOCUMENTS

| 2,925,985 A | 2/1960 | MacDavid |
| 3,279,498 A * | 10/1966 | McKinley et al. ........ 137/630.15 |
| 3,620,247 A * | 11/1971 | Curnow ........................ 137/359 |
| 3,624,753 A | 11/1971 | Brumm |
| 3,631,894 A | 1/1972 | Frantz |
| 3,980,095 A * | 9/1976 | McAvoy ..................... 137/115.1 |
| 4,634,833 A | 1/1987 | Chemnitz |
| 4,699,351 A * | 10/1987 | Wells .............................. 251/29 |
| 5,233,835 A | 8/1993 | Gawlick |
| 5,421,545 A * | 6/1995 | Schexnayder ............. 251/30.02 |
| 5,645,263 A * | 7/1997 | Aardema .................... 251/30.02 |
| 6,149,125 A | 11/2000 | Nilsson |
| 6,161,769 A | 12/2000 | Kircher et al. |
| 6,682,316 B1 | 1/2004 | Böke |

FOREIGN PATENT DOCUMENTS

| DE | 1196458 | 7/1965 |
| DE | 2137314 A1 | 2/1973 |
| DE | 3306317 A1 | 8/1984 |
| DE | 102004054888 B3 | 4/2006 |
| EP | 1271026 A1 | 2/2003 |
| WO | 97/38363 A1 | 10/1997 |
| WO | 2005/031202 A1 | 4/2005 |
| WO | 2007/065776 A1 | 6/2007 |

* cited by examiner

*Primary Examiner* — William McCalister
(74) *Attorney, Agent, or Firm* — McCormick, Paulding & Huber LLP

(57) ABSTRACT

The invention concerns a valve arrangement (7) comprising a flow path (11) connecting an inlet (9) and an outlet (10), a closing means (12) arranged in said flow path (11), a resetting means and a first pressure in a first pressure chamber (14) acting in a closing direction on said closing means (12), a pressure of said outlet (10) and a second pressure in a second pressure chamber (18) corresponding to a pressure of said inlet (9) when said closing means (12) is closed acting in opening direction on said closing means (12), said first pressure chamber (14) being connectable to the outlet (10) via an auxiliary valve (13). It is intended to keep small a pressure pulse when opening the valve arrangement (7). This is achieved in that the closing means (12) having a first opening state (A) and a second opening state (B), a flow resistance of said closing means (12) in said first opening state (A) being larger than a flow resistance of said closing means in said second opening state (B).

6 Claims, 6 Drawing Sheets

VALVE ARRANGEMENT

CROSS REFERENCE TO RELATED APPLICATION

Applicant hereby claims foreign priority benefits under U.S.C. §119 from European Patent Application No. 09007191.1 filed on May 29, 2009, the contents of which are incorporated by reference herein.

FIELD OF THE INVENTION

The invention concerns a valve arrangement comprising a flow path connecting an inlet and an outlet, a closing means arranged in said flow path, a resetting means and a first pressure in a first pressure chamber acting in a closing direction on said closing means, a pressure of said outlet and a second pressure in a second pressure chamber corresponding to a pressure of said inlet when said closing means is closed acting in opening direction on said closing means, said first pressure chamber being connectable to the outlet via an auxiliary valve.

BACKGROUND OF THE INVENTION

Such a valve arrangement is known from WO 2005/031202 A1.

The closing means forms a pilot controlled valve means. Such a valve means is particularly used in connection with a control of water, which is exposed to a high pressure. Applications are, for example, snow generating devices and moistening devices.

A snow generating device is used as example for illustrating the present invention. However, the invention is not limited to a valve arrangement in connection with a snow generating device.

A snow generating devices uses water which is supplied with a rather high pressure of 20 to 120 bar. This water is atomised and sprayed into cold air in order to produce snow. When the snow generating device is not in use, it must be emptied in order to avoid damages caused by frozen water.

When the operation of the snow generating device starts, the valve arrangement is opened by actuating the pilot valve. However, since the water is supplied to the empty snow generating device with the above mentioned high pressure in the range of 20 to 120 bar, a pressure pulse is generated in the snow generating device which can be detrimental.

SUMMARY OF THE INVENTION

The invention is based on the task to keep a pressure pulse small when opening the valve arrangement.

With a valve arrangement as mentioned in the introduction this task is solved in that said closing means having a first opening state and a second opening state, a flow resistance of said closing means in said first opening state being larger than a flow resistance of said closing means in said second opening state.

When the valve arrangement opens to connect the pressure source with the snow generating device, the water is in a first step supplied via the closing device in the first state. The closing device has a rather high flow resistance so that a corresponding large pressure drop occurs over the closing device. Nevertheless, the closing device is filled with water and the pressure in the snow generating device increases. When the snow generating device is completely filled or other conditions are met, the closing device opens to the second opening state so that the supply of water is no longer restricted as before. The flow resistance of the closing device in the second opening state is far lower than in the first opening state. During operation of the snow generating device a permanent supply of water under high pressure is required. The supply can be realised since the closing device in the second opening state has only a rather low flow resistance. If the valve arrangement is not used in connection with a snow generating device, any other suitable hydraulic fluid can be used. In the following the invention is illustrated using water as an example of an hydraulic fluid. However, the invention is not limited to water as hydraulic fluid.

In a preferred embodiment the second opening state of said closing means is established by a pressure at the outlet which exceeds a predetermined value. In other words, the valve arrangement is self-controlled. The water supplied to the snow generating device fills the snow generating device increasing the pressure at the outlet. When the predetermined pressure value is reached, the valve arrangement "knows" that it now can fully open and supply water without having the risk of a strong pressure pulse in an empty system.

Advantageously said resetting means comprises at least a spring. A spring is a rather simple embodiment of a resetting means. It has the advantage that the spring force increases when the spring is compressed. This characteristic can be used to establish the different opening degrees or opening states of the closing means.

It is advantageous that said closing means comprises at least a first valve element and a second valve element. Using at least two valve elements gives a rather simple construction of the valve arrangement in which two different opening conditions can be established.

Preferably said first pressure chamber and said second pressure chamber are connected via an orifice running through said first valve element. In dependence of the position of the first valve element water is supplied from the second pressure chamber to the first pressure chamber. It is therefore possible to create a sufficient pressure in the first pressure chamber to move the first valve element from an opening position to a closing position in case the valve arrangement should close. Since the orifice is arranged in the valve element it is not possible that this orifice is closed by a movement of said first valve element.

Preferably the first valve element together with a first valve seat forms a valve means, the second valve element together with a second valve seat forms a throttling means and the valve means and the throttling means are connected in series. When the valve means opens, the flow of water is restricted by the throttling means. Only when the throttling means opens too, the flow of water is almost unrestricted. This is a rather simple construction of the valve arrangement.

Preferably said first valve element is slidingly arranged around said second valve element, said second valve element protrudes through said first valve seat, and said second valve seat is formed by a ring bearing said first valve seat. Such an embodiment allows a rather compact construction. A gap between the second valve element and the second valve seat forms the throttling means. It is possible to determine the throttling characteristics of this throttling means by forming the second valve element and/or the second valve seat with corresponding geometries.

Preferably a first spring acts on said first valve element and a second spring acts on said second valve element. In this manner it is possible to make the closing means so that the movement of the first valve element requires a smaller force than the movement of the second valve element. Since the second valve element moves in opening direction under the control of the pressure at the outlet, the second spring can be dimensioned depending on the predetermined pressure at which the closing device should be brought into the second opening state.

Preferably said second valve element comprises a moving restrictor stopping a movement of said second valve element in closing direction. Such a moving restrictor can be made by a step or any other protrusion abutting against a part of the housing in which the second valve element is arranged. Such a second valve element can be positioned in the second valve seat with a rather high precision.

In another preferred embodiment said first pressure chamber is connected with said outlet via a second orifice, and said second valve element together with a second valve seat is forming a second valve means arranged parallel to said second orifice. Since the second pressure chamber and the first pressure chamber are connected via the first orifice, the first orifice and the second orifice form a pressure divider when the auxiliary valve is opened. This means that in the first pressure chamber a pressure is established which is between the pressure at the inlet and the pressure at the outlet. This "medium" pressure acts in closing direction on the first valve element so that the first valve element is moved only a short distance away from the first valve seat until this medium pressure together with the force of the resetting means has an equilibrium to the force generated by the pressure of the outlet. This allows only a restricted flow of water through the gap between the first valve element and the first valve seat. When the second valve is open, the first pressure chamber is connected to the outlet without the second orifice. Therefore, the pressure in the first pressure chamber is lowered so that the pressure at the outlet can move the first valve element to the fully opened state.

Preferably said second valve element is actuatable by a pressure at said outlet. When the pressure at the outlet reaches the predetermined value, the second valve is opened connecting automatically the first pressure chamber with the outlet so that the closing means is automatically moved to the fully opened state.

In another preferred embodiment a third valve means is arranged between said inlet and said outlet opening a restricted flow passage when it is loaded by said first pressure in said first pressure chamber which loading is controlled by said auxiliary valve. The third valve means is a kind of pre-filling means by which water (or like in all other embodiments any other fluid) can flow from the inlet to the outlet without causing a pressure pulse in the empty outlet. This allows a controlled increase of the pressure in the outlet. When the outlet and the snow generating means are filled sufficiently with water, the closing means can fully open to supply the outlet and the snow generating device with the required flow of water.

Preferably said second valve element opens a passage between the first pressure chamber and said outlet when the pressure at said outlet exceeds a predetermined value. The second valve element is opened automatically when the outlet and the snow generating device are filled sufficiently with water so that a pressure pulse in an empty or only partly filled system can be avoided. When the first pressure chamber is connected to the outlet, the first valve element can be moved away from the first valve seat since the pressure in the first pressure chamber is sufficiently low and the pressure at the inlet acts in opening direction on the first valve element. No further action from the outside is required.

BRIEF DESCRIPTION OF THE DRAWINGS

In the following, the invention is explained in detail on the basis of preferred embodiments in connection with the drawings, showing.

DETAILED DESCRIPTION OF THE PREFERRED EMBODIMENTS

Figure 1A:
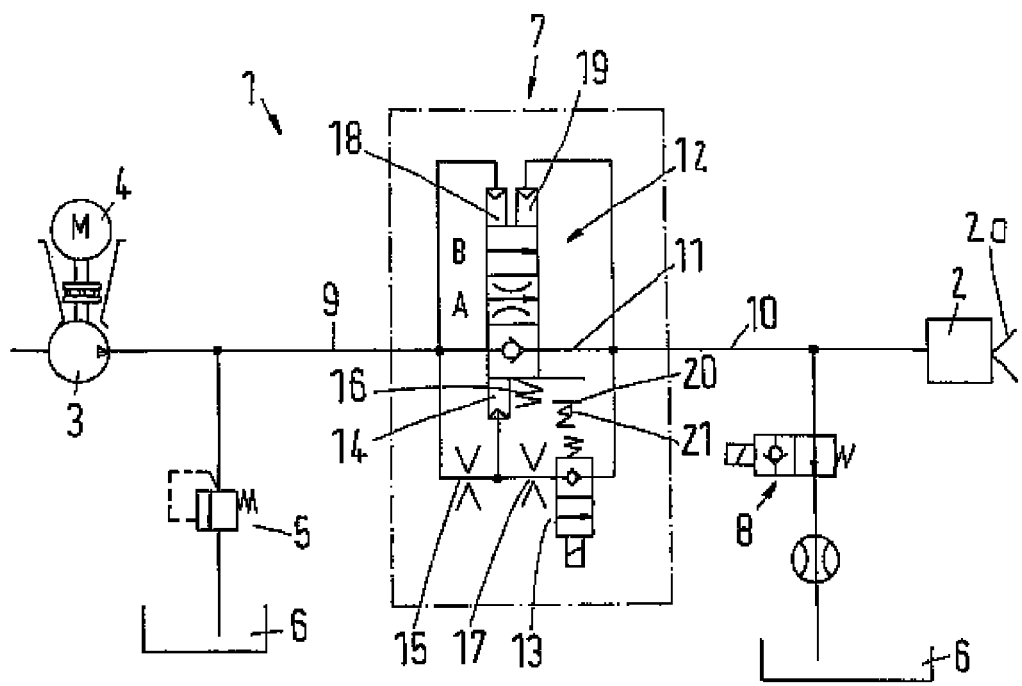
FIG. 1a is a schematic illustration of an hydraulic circuit.

FIG. 1 shows an hydraulic circuit 1 supplying a snow generating device 2 with water under high pressure. The snow generating device 2 comprises nozzles 2a through which the water is outputted generating water droplets or a water mist. Therefore, in operation the snow generating device has a permanent water requirement. A pump 3 driven by a motor 4 generates a pressure in the range of 20 bar or more. The pressure is limited by a safety valve 5 having an opening pressure of 110 bar for example. When the safety valve 5 opens, water is drained to a tank 6. The pump 3 can be replaced by any other pressure generating device, e.g. a tank or a reservoir being arranged higher than the snow generating device 2.

The snow generating device 2 is connected to the pump 3 via a valve arrangement 7. Furthermore, it is connected to the tank 6 via a draining valve 8. When the snow generating device is not in use, the draining valve 8 is opened to let the water come out in order to avoid damages by frozen water in the snow generating device.

When the snow generating device 2 is empty, i.e. more or less completely filled with air, it is dangerous to supply the water from the pump 3 with full pressure. In this case, a pressure pulse would be generated with the risk to damage the snow generating device 2.

The valve arrangement 7 comprises an inlet 9 and an outlet 10 which are connected by a flow path 11.

Figure 1B:
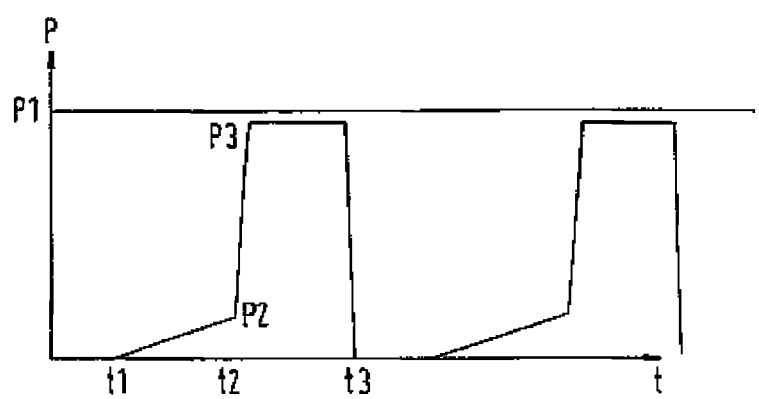
FIG. 1b shows the pressure P over the time t at the outlet.

A closing means 12 is arranged in said flow path 11, said closing means having a fully closed condition. This condition is shown in the Fig. Furthermore, said closing means has a first opening state A and a second opening state B. The flow resistance of said closing means 12 in said first opening state A is larger than the flow resistance of the said closing means 12 in said second opening state B. In other words, the closing means 12 is fully opened in the second opening state B and partly opened in the said first opening state A. FIG. 1B shows the pressure P over the time t at the outlet. Pressure P1 is the outlet pressure of pump 3. From time t1 to time t2 the closing means 12 is only partly opened so that the pressure can only increase slowly from zero to a pressure P2. At time t2 the closing means 12 is opened to the fully opened condition B so that the pressure is rapidly increased to a pressure value P3. This pressure value P3 is maintained constant until the closing means 12 is fully closed.

The increase from pressure P2 to pressure P3 is performed when the snow generating device 2 is completely or almost completely filled with water so that no air or only small volumes of air are compressed by the incoming water. From time t2 to time t3 water is supplied with sufficient pressure and sufficient flow in order to enable the snow generating device 2 to produce snow.

In order to open the valve arrangement 7 an auxiliary valve 13 is arranged between the inlet 9 and the outlet 10 parallel to the closing means 12. A first pressure chamber 14 is connected via a first orifice 15 with the inlet 9. Therefore, when the closing means 12 is closed, in the first pressure chamber 14 there is a first pressure corresponding to the pressure at the inlet 9. This first pressure in said first pressure chamber 14 acts in closing direction on said closing means 12. Furthermore, a resetting means in form of a spring 16 also acts in closing direction on said closing means 12.

The first pressure chamber 14 is connected to the outlet 10 via the auxiliary valve 13 and a second orifice 17. When the auxiliary valve 13 opens, the first pressure in said first pressure chamber 14 will be an intermediate pressure between the pressure at said inlet 9 and said outlet 10.

Said inlet 9 is connected to a second pressure chamber 18. The pressure in said pressure chamber 18 ("the second pressure") acts in opening direction on the closing means 12. Additionally, the outlet 10 is connected to a third pressure chamber 19. Therefore, the pressure at the outlet 10 acts in opening direction on said closing device 12.

The operation of said valve arrangement can be described at follows:

When the auxiliary valve 13 is closed, the first pressure in the first pressure chamber 14 together with the resetting means (spring 16) move the closing means 12 in fully closed condition. No further water is supplied to the snow generating device 2. The snow generating device 2 can be emptied via the draining valve 8.

When the snow generating device 2 is started, the draining valve 8 is closed. The auxiliary valve 13 is opened. The first pressure in the first pressure chamber 14 is lowered via the second orifice 17. The pressure difference between the second pressure chamber 18 and the first pressure chamber 14 exceeds the force of the spring 16, so that the closing means 12 is moved into the first opening state A, i.e. into a partly opened condition. A further movement is not possible at this moment since the closing means 12 is stopped by a stop 20 which is supported by a second spring 21.

Nevertheless, water flows through the flow path 11 from the inlet 9 to the outlet 10 increasing the pressure at the outlet 10. This pressure increase in the third pressure chamber 19 increases the force acting in opening direction on the closing means 12. When a predetermined pressure P2 is reached in the outlet 10, the pressure difference between the third pressure chamber 19 and the first pressure chamber 14 exceeds the force of the second spring 21 so that the closing means 12 is fully opened, i.e. brought into the second opening condition in which the water can flow more or less unrestricted through the flow path 11. Only a small pressure drop appears across the closing means 12.

When the valve arrangement is to be closed, the auxiliary valve 13 closes. The first pressure in the first pressure chamber 14 increases to the outlet pressure P1 of the pump. The effective pressure area in the first pressure chamber 14 is larger than the effective area in the second pressure chamber 18. Therefore, the closing means 12 is closed.

Figure 1C:
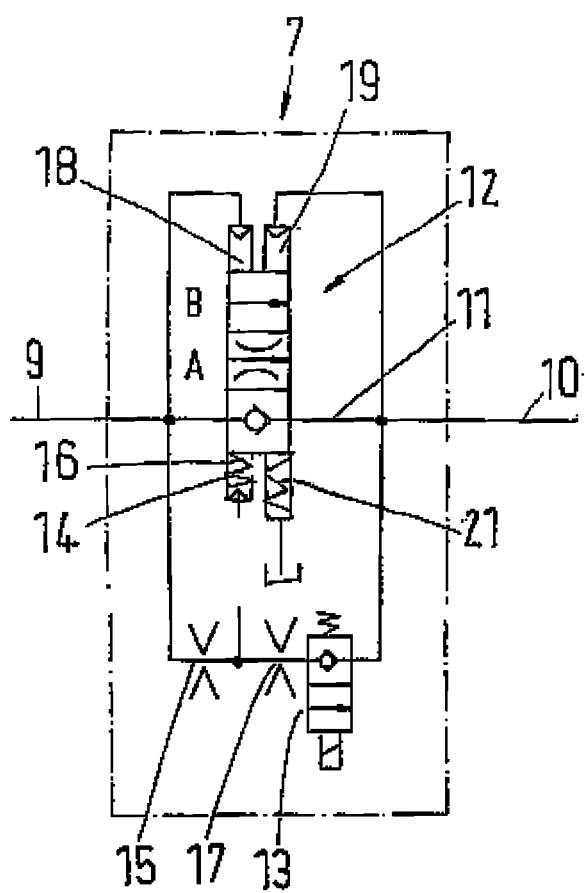
FIG. 1c shows a slightly modified valve arrangement 7 in which a chamber in which the second spring 21 is arranged is open to atmosphere.
Figure 2:
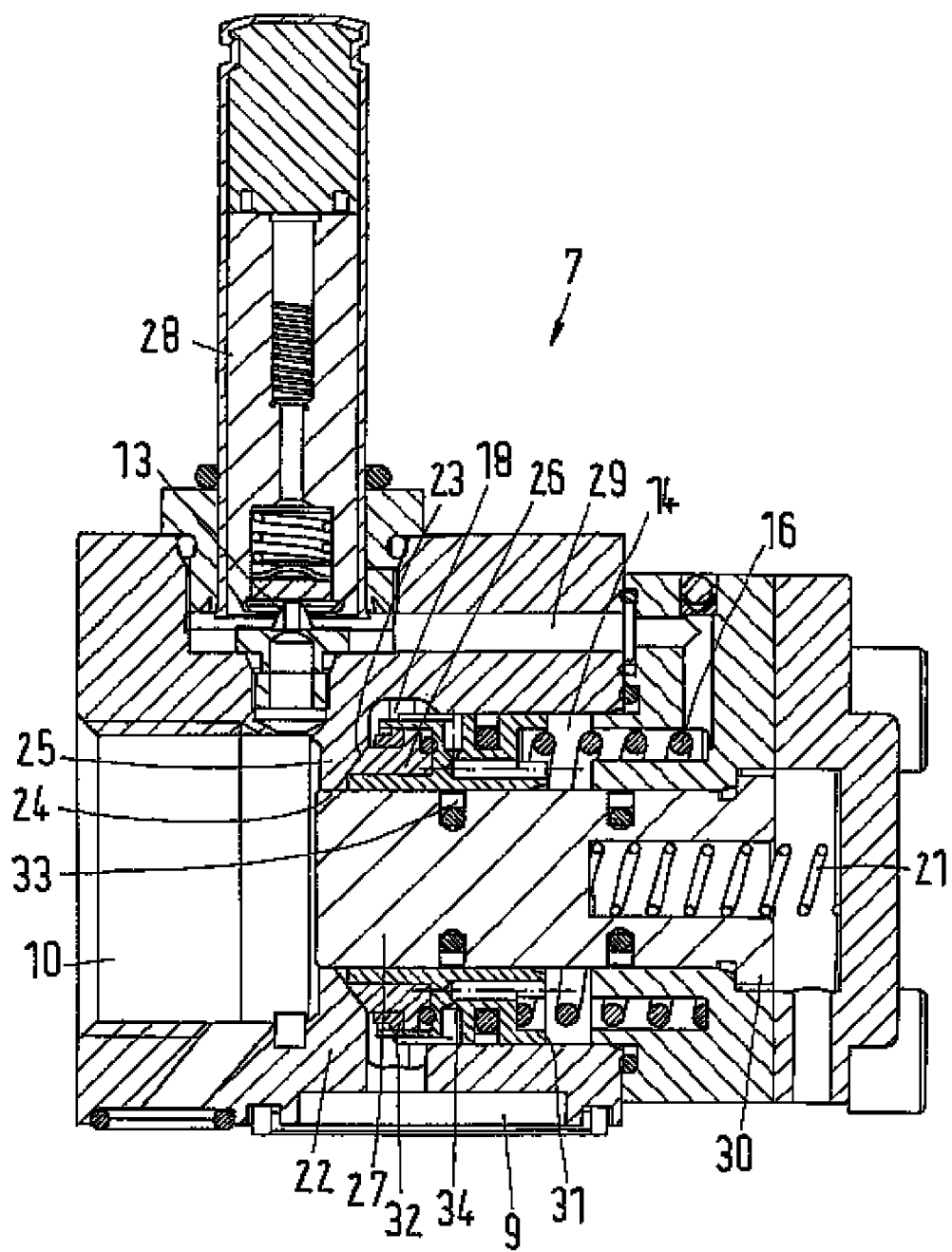
FIG. 2 shows a first embodiment of a valve arrangement with a closing means in fully closed state.

FIG. 1c shows a slightly modified valve arrangement 7 in which a chamber in which the second spring 21 is arranged is open to atmosphere. All other elements are the same.

FIGS. 2 to 5 show a first embodiment of said valve arrangement 7 with more details.

The same elements as in FIG. 1 are designated with the same numerals.

The inlet 9 and the outlet 10 are arranged in a housing 22 forming a first valve seat 23 and a second valve seat 24. The second valve seat 24 is formed at the radial inner part of a ring section 25 of the housing 22 bearing the first valve seat 23.

A first valve element 26 together with said first valve seat 23 form a valve means. When the first valve element 26 is in contact with the first valve seat 23, the valve arrangement 7 is fully closed.

A second valve element 27 protrudes through said second valve seat 24 and together with said second valve seat 24 form a throttling means. In other words, there is a small gap between the second valve element 27 and the second valve seat 24. When the first valve element 26 is moved away from the first valve seat 23 (opening the valve means) the flow of water from the inlet 9 to the outlet 10 is throttled by the throttling means.

The inlet 9 is connected to the second pressure chamber 18. The outlet 10 is connected to the first pressure chamber 14 via the auxiliary valve 13. The auxiliary valve 13 comprises an electromagnet 28. The auxiliary valve 13 is arranged in a channel 29 connecting the second pressure chamber 18 and the outlet 10.

The first spring 16 acts on the first valve element 26 in closing direction. The second spring 21 acts on the second valve element 27 in closing direction. The second valve element 27 comprises a moving restrictor 30 bearing against the housing 22 when the throttling means exhibits the largest flow restriction. The second spring 21 is arranged in a spring chamber which opens to atmosphere.

The second spring 21 is a resetting means. However, other means can be used to generate a resetting force, e.g. an external fluid pressure (liquid or gas), a motor or a lever loaded from the outside.

The pressure in the first pressure chamber 14 acts on a first pressure area 31. The pressure in the second pressure chamber 18 acts on a second pressure area 32. The second pressure area 32 is larger than the first pressure area 31.

The first valve element 26 is slidingly arranged around the second valve element 27, i.e. it forms a hollow cylinder, the inner diameter of which corresponds to the outer diameter of the second valve element 27. Sealing means 33 are provided to prevent a flow of water between the first valve element 26 and the second valve element 27.

An orifice 34 is provided in the first valve element 26 connecting the first pressure chamber 14 and the second pressure chamber 18, i.e. the first pressure chamber 14 and the inlet 9. This orifice 34 corresponds to the orifice 15 of FIG. 1.

The operation of this valve arrangement 7 is explained in connection with FIGS. 2 to 5.

Figure 3:
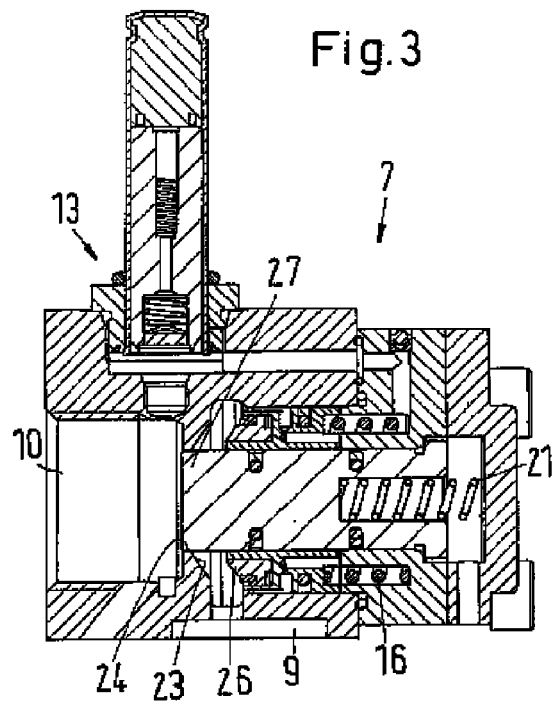
FIG. 3 shows said valve arrangement with the closing means in partly opened state.
Figure 4:
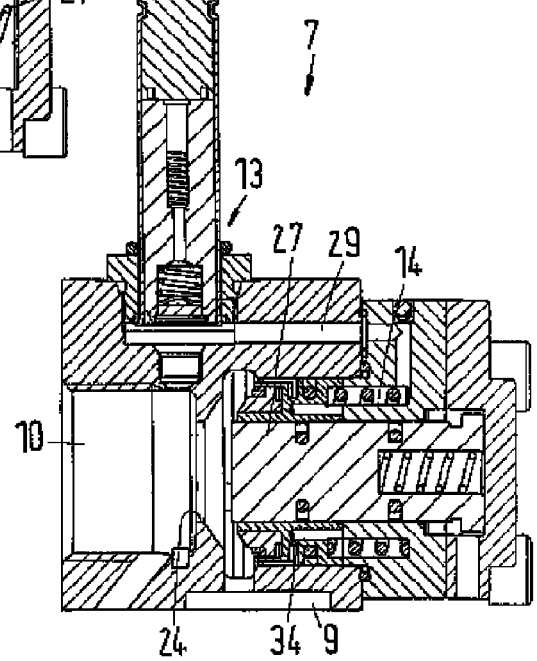
FIG. 4 shows said valve arrangement with the closing means in fully opened state.
Figure 5:
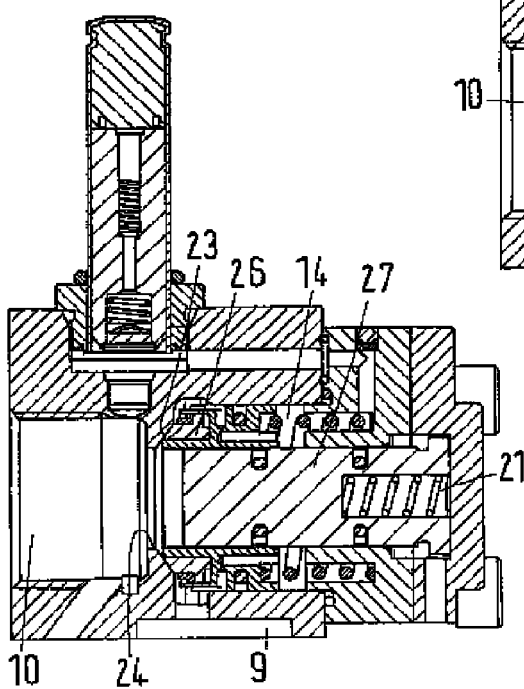
FIG. 5 shows said valve arrangement during closing of the closing means.

It is assumed that the snow generating device 2 has been drained. Therefore, the pressure at the outlet 10 is very low. When the auxiliary valve 13 is opened, the first pressure in the first pressure chamber 14 is lowered almost to the pressure value at the outlet 10. The pressure in the second pressure chamber 18 is the pressure at the inlet 9. Although the first pressure area 31 in the first pressure chamber 14 is larger than the second pressure area 32 in the second pressure chamber 18, the force acting in the opening direction on the first valve element 26 exceeds the force of the first spring 16 moving the first valve element 26 away from the first valve seat 23. This condition is shown in FIG. 3. In FIGS. 3 to 5 elements of the auxiliary valve 13 have been omitted.

When the first valve element 26 has been moved away from the first valve seat 23, the flow of water from the inlet 9 to the outlet 10 is restricted by the throttling means formed by the second valve element 27 and the second valve seat 24, i.e. the water flows through a gap between the second valve element 27 and the second valve seat 24. This gap can be shaped ring-like having a radial thickness of $^{15}/_{100}$ mm, for example. It may be smaller or larger depending on the application and the desired flow restriction. The throttling characteristic of this throttling means can be adjusted by designing the form of the second valve seat 24 and the form of the second vale element 27.

Water flowing from the inlet 9 to the outlet 10 will increase the pressure at the outlet 10. When the pressure at the outlet 10 exceeds a predetermined value, the force on the second valve element 27 generated by the pressure at the outlet 10 exceeds the force generated by the second spring 21 so that the second valve element 27 is moved out of the second valve seat 24 fully opening the connection between the inlet 9 and the outlet 10. This condition is shown in FIG. 4.

The first pressure chamber 14 receives permanently water from the inlet 9 via the orifice 34. However, this water escapes through the channel 29 to the outlet 10 as long as the auxiliary valve 13 is open.

When the auxiliary valve 13 is closed, the first valve element 26 by the pressure in the first pressure chamber 14 is moved back to the first valve seat 23 closing the valve means 7. For a short time the second valve element 27 remains out of the second valve seat 24 (FIG. 5). However, since no further water is supplied from the inlet 9 to the outlet 10, the pressure at the outlet 10 drops and the second spring 21 will move the second valve element 27 back to the condition shown in FIG. 2.

Figure 6:
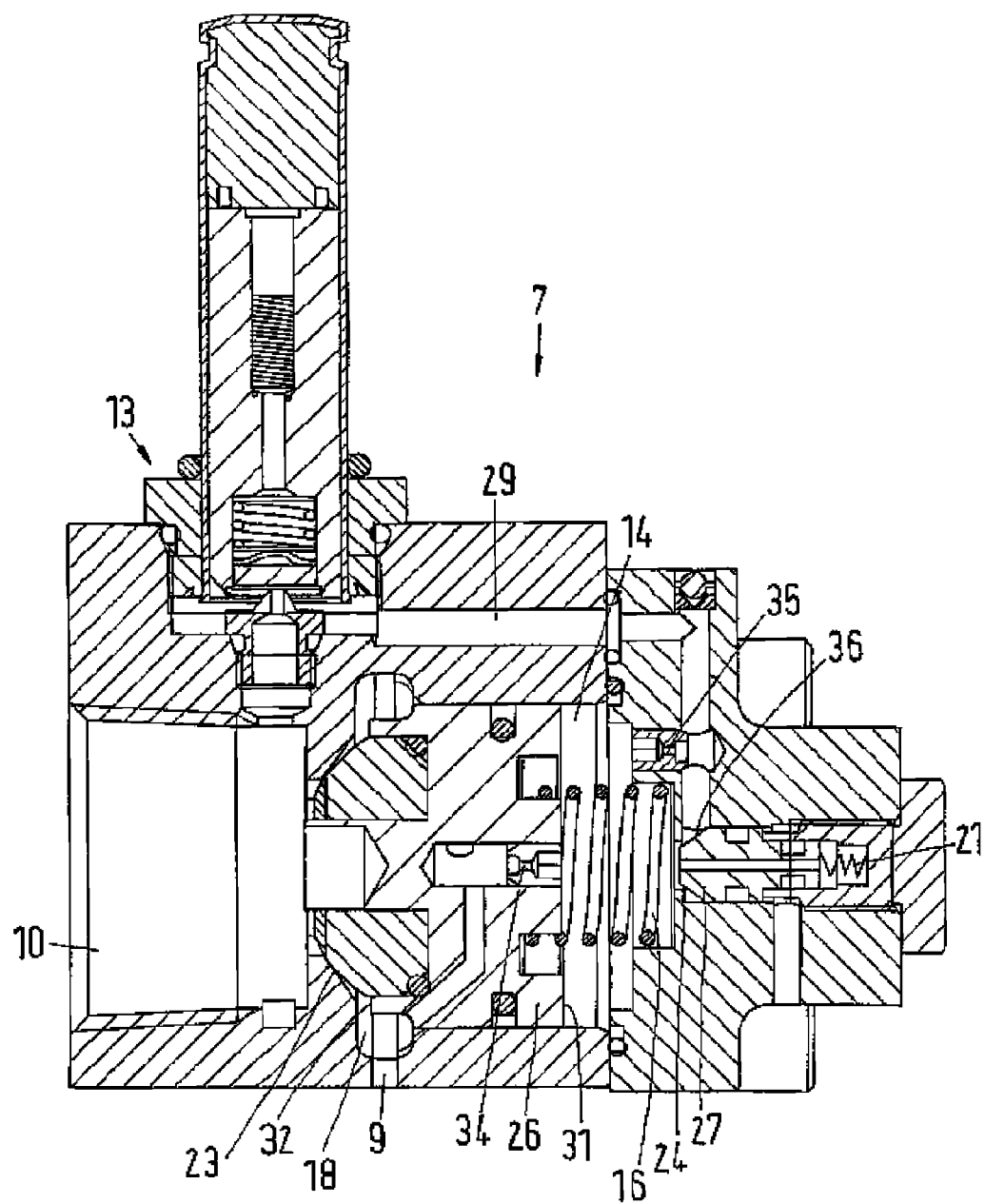
FIG. 6 is a second embodiment of the valve arrangement.

FIG. 6 shows a second embodiment of a valve arrangement 7 in which like elements as in FIGS. 1 to 5 are designated with the same numerals.

In the condition shown the valve arrangement 7 is fully closed. The first valve element 26 together with the first valve seat 23 seal a connection between the inlet 9 and the outlet 10.

The first pressure chamber 14 is connected via a second orifice 35 and the auxiliary valve 13 to the outlet 10.

In the initial state (valve arrangement fully closed) the first pressure in the first pressure chamber 14 equals the pressure at the inlet 9. The pressure at the outlet 10 is almost zero. The first pressure area 31 is much larger than the second pressure area 32.

When the auxiliary valve 13 opens, a flow is established between the inlet 9 and the outlet 10 via the two orifices 34, 35. Therefore, the first pressure in the first pressure chamber 14 drops to an intermediate value between the pressure at the inlet 9 and the pressure at the outlet 10. The orifices 34, 35 are so designed that the force difference over the first valve element 26 which is generated by the pressure in the first pressure chamber 14 acting on the first pressure area 31 and the pressure in the second pressure chamber 18 acting on the second pressure 32 exceeds slightly the force of the first spring 16. However, the force difference is only slightly larger than the force of the first spring 26. Therefore, an equilibrium is reached when the first valve element 26 is moved away from the first valve seat 23 by a small distance in the range of a few millimeters or less. In this condition, a restricted flow from the inlet 9 to the outlet 10 is possible. This flow increases the pressure at the outlet 10.

The second valve element 27 together with the second valve seat 24 form a second valve means which is arranged parallel to the second orifice 35. The second valve element 27 is forced against the second valve seat 24 by means of the second spring 21. The pressure in the channel 29 which corresponds to the pressure at the outlet 10 acts on a pressure area 36 of the second valve element 27.

When the pressure at the outlet 10 has reached a predetermined value, the force generated by this pressure (transmitted via the channel 29 to the second valve element 27) acting on the pressure area 36 of the second valve element 27 exceeds the force of the second spring 21, and the second valve means is open since the second valve element 27 is moved away from the second valve seat 24. In this case, the pressure in the first pressure chamber 14 drops further to the pressure value at the outlet 10. The pressure difference over the first valve element 26 now is big enough to compress the first spring 16 completely so that the first valve element 26 is moved further away from the first valve seat 23, and the valve arrangement 7 fully opens.

When the auxiliary valve 13 closes, the first pressure in the first pressure chamber 14 increases since water is permanently supplied via the orifice 34. Since at the same time the pressure at the outlet 10 drops, the first valve element 26 is moved back to contact the first valve seat 23 to close the valve arrangement 7.

Figure 7:
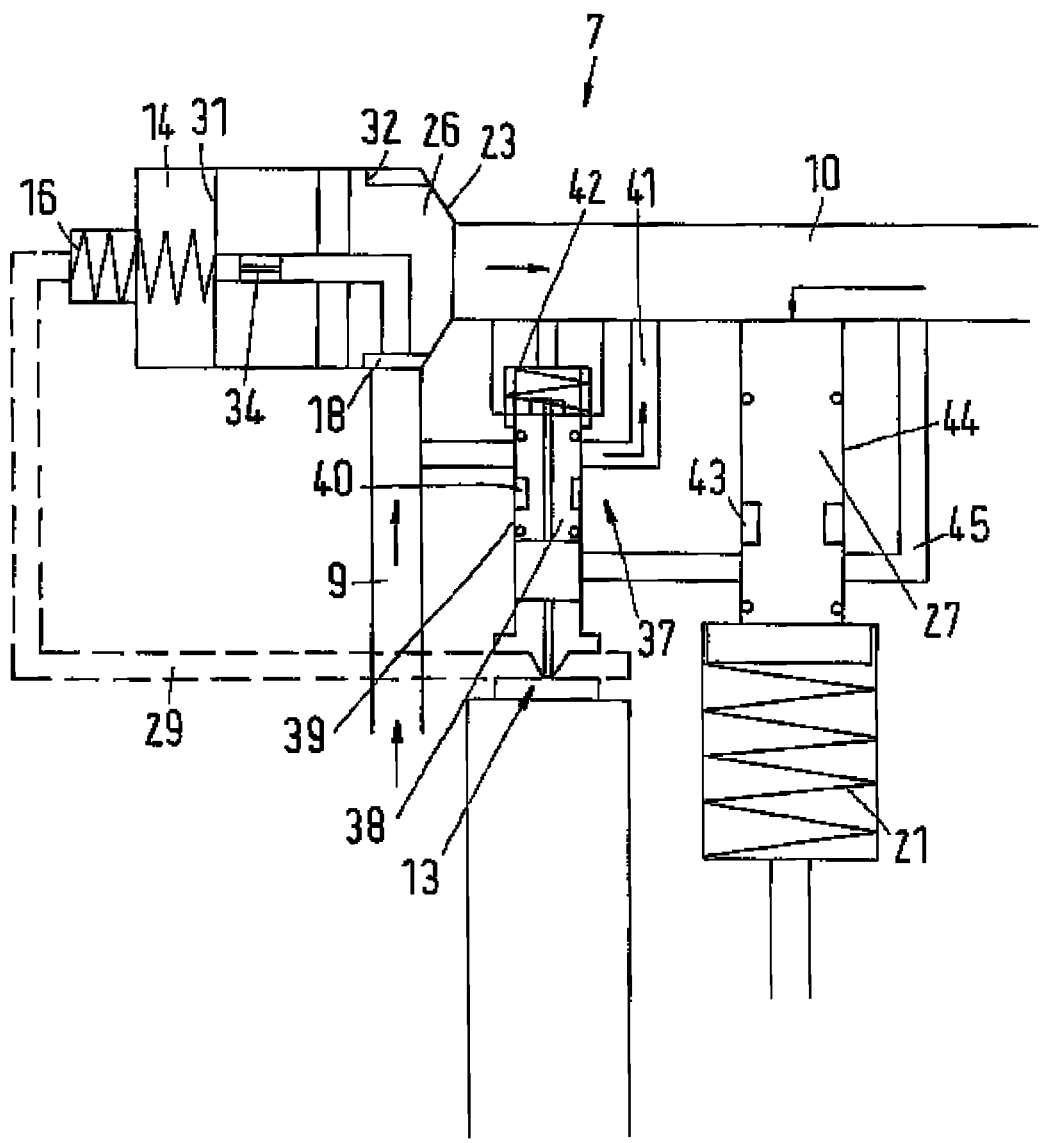
FIG. 7 is a schematic illustration of a third valve arrangement.

FIG. 7 shows a further embodiment of a valve arrangement 7. Like elements as in FIGS. 1 to 6 are designated with the same numerals.

In the condition shown in FIG. 7 the valve arrangement 7 is fully closed. The first valve element 26 together with the first valve seat 23 stop any flow from the inlet 9 to the outlet 10. The first pressure in the first pressure chamber 14 corresponds to the pressure at the inlet 9 since the inlet 9 is connected to the first pressure chamber 14 by the first orifice 34.

A third valve means 37 is provided having a third valve element 38 arranged in a bore 39. The third vale element 38 comprises a circumferential grove 40. The bore 39 intersects an auxiliary channel 41. A third spring 43 acts on the third valve element 38 in order to bring the grove 40 out of overlap with the auxiliary channel 41. Therefore, the auxiliary channel 41 between the inlet 9 and the outlet 10 is closed.

When the auxiliary valve opens, the first pressure in the first pressure chamber 14 acts on the third valve element 38 in opening direction and moves the third valve element 38 so that the grove 40 overlaps the auxiliary channel 41. Therefore, a flow of water is established between the inlet 9 and the outlet 10. The first valve element 26 resting against the first valve seat 23. The flow of water through the auxiliary channel 41 is restricted by the third valve means 37, i.e. the pressure in the outlet 10 increases only slowly by a kind of prefilling.

The second valve element 27 likewise comprises a circumferential grove 43. The second spring 21 shifts the second valve element 27 within a bore 44 to bring the grove 43 out of overlapping with an channel 45.

When the pressure in the outlet 10 generates a force on the second valve element 27 exceeding the force of the second spring 21, the second valve element 27 is moved so that the grove 43 overlaps the channel 45. This overlapping establishes a connection from the first pressure chamber 14 via the channel 29 and the channel 45, the auxiliary valve 13 and the channel 45 to the outlet 10. The first pressure in the first pressure chamber 14 rapidly drops so that this first pressure together with the force of the first spring 16 is no longer able to withstand the force generated by the pressure in the second pressure chamber 18 acting on the second pressure area 32 of the first valve element 26. The first valve element 26 is moved away from the first valve seat 23 against the force of the first spring 16, and the valve arrangement is fully opened.

When the valve arrangement 7 is to be closed, the auxiliary valve 13 is closed so that the first pressure in the first pressure chamber 14 increases to the pressure at the inlet 9 via the orifice 34, and the first valve element 26 is moved back to contact the valve seat 23.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A valve arrangement comprising a flow path connecting an inlet and an outlet, a closing means arranged in said flow path, a resetting means and a first pressure in a first pressure chamber acting in a closing direction on said closing means, a pressure of said outlet and a second pressure in a second pressure chamber corresponding to a pressure of said inlet when said closing means is closed acting in an opening direction on said closing means, said first pressure chamber being connectable to the outlet via an auxiliary valve, wherein the closing means has a first opening state and a second opening state, a flow resistance of said closing means in said first opening state being larger than a flow resistance of said closing means in said second opening state, wherein said closing means comprises at least a first valve element and a second valve element, wherein said first valve element together with a first valve seat form a valve means, said second valve element together with a second valve seat form a throttling means, and the valve means and the throttling means are connected in series, wherein said first valve element is slidingly arranged around said second valve element, said second valve element protrudes through said first valve seat, and said second valve seat is formed by a ring bearing said first valve seat.

2. The valve arrangement according to claim 1, wherein the second opening state of said closing means is established by a pressure at the outlet which exceeds a predetermined value.

3. The valve arrangement according to claim 1, wherein said resetting means comprises at least a spring.

4. The valve arrangement according to claim 1, wherein said first pressure chamber and said second pressure chamber are connected via an orifice running through said first valve element.

5. The valve arrangement according to claim 1, wherein the resetting means comprises a first spring acting on said first valve element in the closing direction and a second spring acting on said second valve element in the closing direction.

6. The valve arrangement according to claim 1, wherein said second valve element comprises a moving restrictor stopping a movement of said second valve element in closing direction.

* * * * *